United States Patent [19]

Hedenberg

[11] Patent Number: 4,518,171
[45] Date of Patent: May 21, 1985

[54] AIR SUSPENSION SYSTEM

[76] Inventor: William E. Hedenberg, 490 Buffalo Grove R., Buffalo Grove, Ill. 60090

[21] Appl. No.: 541,710

[22] Filed: Oct. 14, 1983

[51] Int. Cl.³ ............................................. B60G 11/26
[52] U.S. Cl. .................................................. 280/711
[58] Field of Search ............... 280/6.1, 701, 711, 713, 280/714, 702, 703

[56] References Cited

U.S. PATENT DOCUMENTS

| 2,879,077 | 3/1959 | Chalmers | 280/711 |
| 4,181,323 | 1/1980 | Raidel | 280/711 |
| 4,206,934 | 6/1980 | McKee | 280/714 |
| 4,379,572 | 4/1983 | Hedenberg | 280/711 |

Primary Examiner—Richard A. Bertsch
Attorney, Agent, or Firm—Robert E. Browne; Ralph R. Rath; Stephen R. Arnold

[57] ABSTRACT

An air suspension system for each rear wheel of van-type vehicles features a seven-point articulated system. A pair of rearwardly diverging torque rods are pivotally attached to the axle hanger to provide a modified parallelogram linkage. The angle of divergence is set by an adjustable torque rod pivot point and an automatic pneumatic height restoration feature to dispose the torque rods at optimum orientation to provide, among other things, a measure of anti-rise action on braking. A pair of air springs mounted on articulated carrier arms carries the weight of the vehicle without the use of assisting springs. Anti-sway is provided by specification of elastic rates of bushings in pivots providing the articulation of the system.

20 Claims, 7 Drawing Figures

FIG-1
PRIOR ART

AIR SUSPENSION SYSTEM

TECHNICAL FIELD

The present invention relates generally to air suspension systems for motor vehicles.

BACKGROUND PRIOR ART

The necessity for an exceptionally smooth ride in emergency ambulances has long been recognized by medical attendants who serve in them. Many enroute procedures must be performed quickly, and among these are certain procedures requiring a significant amount of skill and accuracy. Commonly used techniques such as the insertion of an intravenous drip needle become extremely difficult in a rough-riding vehicle, and control of hemorrage is frequently rendered impossible. These and related problems can seriously interfere with the efforts of the medical crew to save the patient when time factors are critical.

An adequately smooth-riding suspension for such vehicles is clearly a necessity. The design of an appropriate suspension, however, is further complicated by the fact that the loading of the ambulance, particularly over the rear wheels, is a variable factor, being determined by the number of personnel and patients and/or passengers being carried. This virtually mandates the use of a variable compliance suspension, which in turn, for cost reasons at the present state of the art, restricts the designer to an air suspension, wherein the air spring compliance and extension may be controlled by varying the pressure to accommodate varying loading conditions.

Various types of air suspensions have been proposed and used for vehicles in attempts to improve load bearing and riding characteristics. Such equipment is in general heavy, reducing the amount of payload which can be carried. Moreover, these previous systems have been expensive to fabricate and are not readily adaptable to a variety of vehicle constructions, including small bodied vans and trucks which are presently popular. An exception to the foregoing is disclosed in U.S. Pat. No. 4,379,572 issued Apr. 12, 1983 to the inventor of the improved system to be described herein.

It is a feature of the present invention to provide a light weight relatively inexpensive air suspension system improving on the features of the above-referenced patent. Such a system would be a substantial benefit to emergency vehicles and the care offered in connection with such vehicles. It would also be usable in connection with recreational vehicles to improve their ride and handling, as well as with any other type of van or similar motor vehicle.

SUMMARY OF THE INVENTION

The present invention solves many of the problems presented by the prior art by providing an air suspension system which serves as the primary means for supporting the load carried by the vehicle and for absorbing the forces imparted by the traveling surface through the wheels and axle of the vehicle.

According to a feature of the invention, a seven-point articulated rear suspension employs suitably dimensioned elastomeric bushings of specified conical rate to provide an independent suspension with minimum sway without the use of lateral tracking arms. A carrier arm, having an air spring disposed at an intermediate position thereon, is pivotally connected at its forward end to the axle hanger and at its rear end to a shackle pivotally attached to the frame. A shock absorber is connected from the frame to the axle hanger. The hanger is pivotally connected to a pair of preferably rearwardly diverging torque arms to provide, among other things, an anti-rise feature which minimizes rear suspension rise on heavy braking. A pneumatic load-leveling system is employed along with a torque arm pivot location adjustment to provide optimum torque arm positioning for anticipated worst-case rise conditions, e.g. heavily loaded military ambulances with patients riding high over the frame resulting in a high center of gravity.

Extensive field measurements of the preferred suspension retrofitted to a commercial ambulance type vehicle frame establish a marked improvement in ride comfort and handling under varying load conditions, as evidenced by appended test data.

Other advantages and features of the invention will become apparent upon making reference to the description to follow, the drawings, and the claims.

DETAILED DESCRIPTION OF THE INVENTION

While this invention is capable of embodiment in different configurations, there is shown in the drawings and will be described herein, in detail, a preferred embodiment designed to accomplish the central functions thereof. It should be understood that the present disclosure is to be considered an exemplification of the principles of the invention, and is not intended to limit the invention to the embodiment illustrated.

In a previous patent, (U.S. Pat. No. 4,379,572, issued Apr. 12, 1983 to W. Hedenberg) an air suspension system of a retrofit type particularly suited for medium van-size vehicles was disclosed. The aforementioned patent is hereby incorporated by reference into this application. One version of a system disclosed therein is reproduced as FIG. 1 of the present application, and shows the suspension elements associated with one wheel. In this system there is disclosed a highly articulated rear suspension system wherein a carrier arm 2 is disposed generally below a vehicle frame 4, the rear end of the carrier arm 2 being secured to a frame-mounted rear hanger 5 by means of a shackle or pivotal link 6 coupled at either end to the rearmost portion of the carrier arm and the rear hanger by means of pivoting assemblies 8 and 10. The forward end of the carrier arm 2 is connected by a pivot point 16 to an axle hanger 14 to which the vehicle rear axle 16 is secured by means of U-bolts 17. An adjustable arm assembly 18 is pivotally connected at its rearward end to a separate pivot point 20 on a forward portion of the axle hanger 14, and is similarly pivotally attached at its forward end at a pivot point 22 to a forward hanger bracket 24 attached to and depending downward from the frame 4. An adjustment means of conventional design is provided so that the length of the adjustment arm assembly 18 may be varied by means of a turnbuckle 30 adjustably coupling forward and rear portions 18' and 18" respectively of the adjustment arm assembly over an internal arm member 32 so as to vary the overall length of the adjusting arm between the pivot points 20 and 22. Additionally, the height of the forward pivot point 22 can be varied to place the pivot point axis anywhere a the slot 28 in the forward hanger bracket 24, the assembly being secured at a given position with respect to slot by tightening a pivot bolt 26 reaching therethrough. A torque and track arm 34 is attached to the forward hanger bracket 24 at a point above pivot point 22 by pivot means 36, the torque and track arm extending to the rear and towards the center of the vehicle to be pivotally attached at a pivot point 38 to an upper attachment member 40 rigidly secured to the axle 16 at a point well inboard of the carrier arm 2. A principal purpose of this torque and track arm 34 is to prevent lateral sway of the vehicle.

Figure 1:
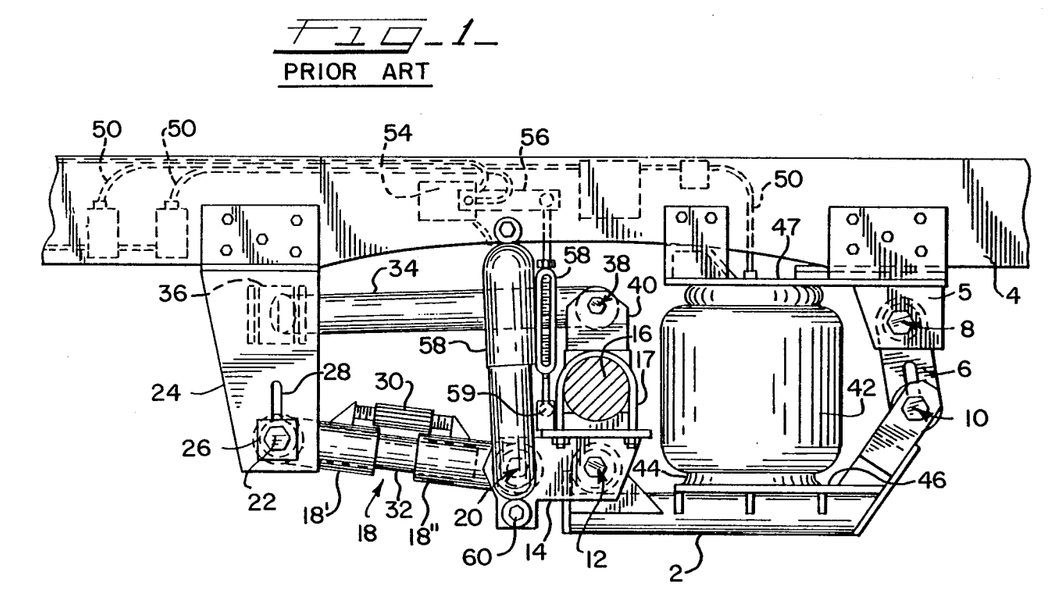
FIG. 1 is a side elevational view of a prior version of an air suspension system as described in U.S. Pat. No. 4,379,572.

The compliant (resilient) support means for the suspension is provided by an air spring 42 attached at a base portion 44 thereof to a horizontally disposed platform 46 fixed to the upper surface of the central region of the carrier arm 2 between pivot points 12 and 10. The upper portion of the air spring is attached to a horizontally disposed air spring hanger plate 47 attached to the frame 4 and hanging therebelow to engage with and secure the upper end of the air spring 42.

A conventional load-leveling feature either supplies high pressure air from a pump (not shown) to a system of air lines 50—50—50 connected to the air springs to provide a surge of high pressure air to the air spring 42 to increase the extension thereof, or alternatively, to allow venting to reduce it. The regulation of the extension of the air spring is governed by a frame-mounted height sensing valve 54 communicating with the air line system 50—50—50 to deliver high pressure air to the spring 42 or to bleed it off according to the sensed standoff distance of the axle hanger 14 with respect to the frame 4, the operation of the height sensing valve 54 being governed by an actuating arm 56 of the valve, the arm being adjustably coupled to a pivot 59 on the axle hanger 14 through an adjustable turnbuckle 58. Thus, in the static situation the height of the vehicle frame above the ground, and consequently the geometrical relationship between the elements of the suspension will be set by the setting of the height sensing adjustment means 58.

Additionally, a shock absorber is connected between the frame 4 by upper mounting means (not shown) and a lower attachment point 60 on the axle hanger 14. The shock absorber 58 is of the conventional telescoping variety, and is employed in the customary manner to damp severe shock which may be transmitted through the wheels by extreme road conditions so as to prevent oscillation or rocking of the vehicle. This element also prevents damage to the air spring 42. It will be noted that this five point design relies totally on the air spring for static support of the load.

FIGS. 3–6 show details of a suspension assembly of the present invention, representing a substantial improvement over the system previously described. Details of the air supply system of FIG. 1, including the height adjusting valve 54, arm 56, and adjustable turnbuckle 58 coupling the arm to the axle hanger (e.g. 92) have been omitted for clarity. Their functions may be taken to be identical in the present version of FIGS. 3–6. In the following discussion where similar components perform similar functions, identical part numbers will be used wherever possible. In all subsequent discussions as well as in the claims the term "axle" or "generally non-rotating axle means" will be understood to refer to either the axle proper in the case of dead, i.e. non-driven axles, or alternatively as the axle housing in the case of live, i.e. powered axles. The term "axle hanger" or "axle attachment means" will be interchangably used to denote those elements fixedly attached to the "axle" as defined above to which suspension elements are attached.

Here the system of FIG. 1, having an inwardly displaced tracking arm 34, is modified into a seven-point system. Two torque arms or rods 70 and 72 are secured at their forward first ends to a forward hanger bracket 24 by pivotal pin connections 74 (second pivoting means) and 76 (first pivoting means) respectively, as shown also in the cutaway view of FIG. 5. The pivot assemblies 74 and 76 are disposed with their pivoting axes parallel to the axle 16. The forward ends of the torque arms 70 and 72 are pivotally secured by elastomeric bushings to constrain the torque arms to move in a vertical plane, with the upper torque arm 72 disposed outboard of the lower arm 70 to provide frame clearance, as best shown in FIG. 5.

Figures 2, 6:
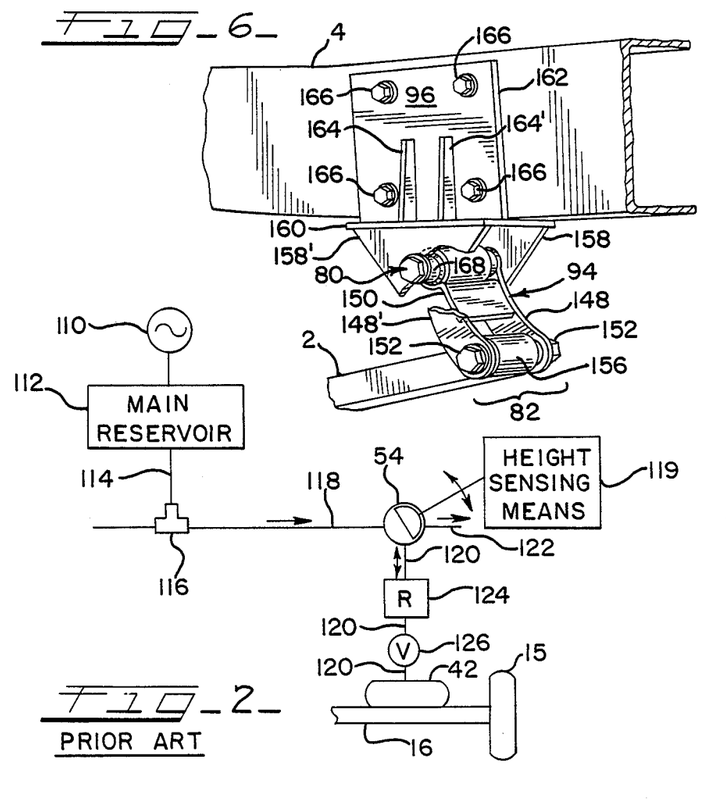
FIG. 2 is a schematic view showing an air supply system for supplying and controlling the flow of air to and from the air springs used in connection with the air suspension system described in this invention.
FIG. 6 is a partially sectioned perspective view of the rear attachment region of the suspension of FIGS. 3 and 4, showing details of a rear shackle.
Figure 3:
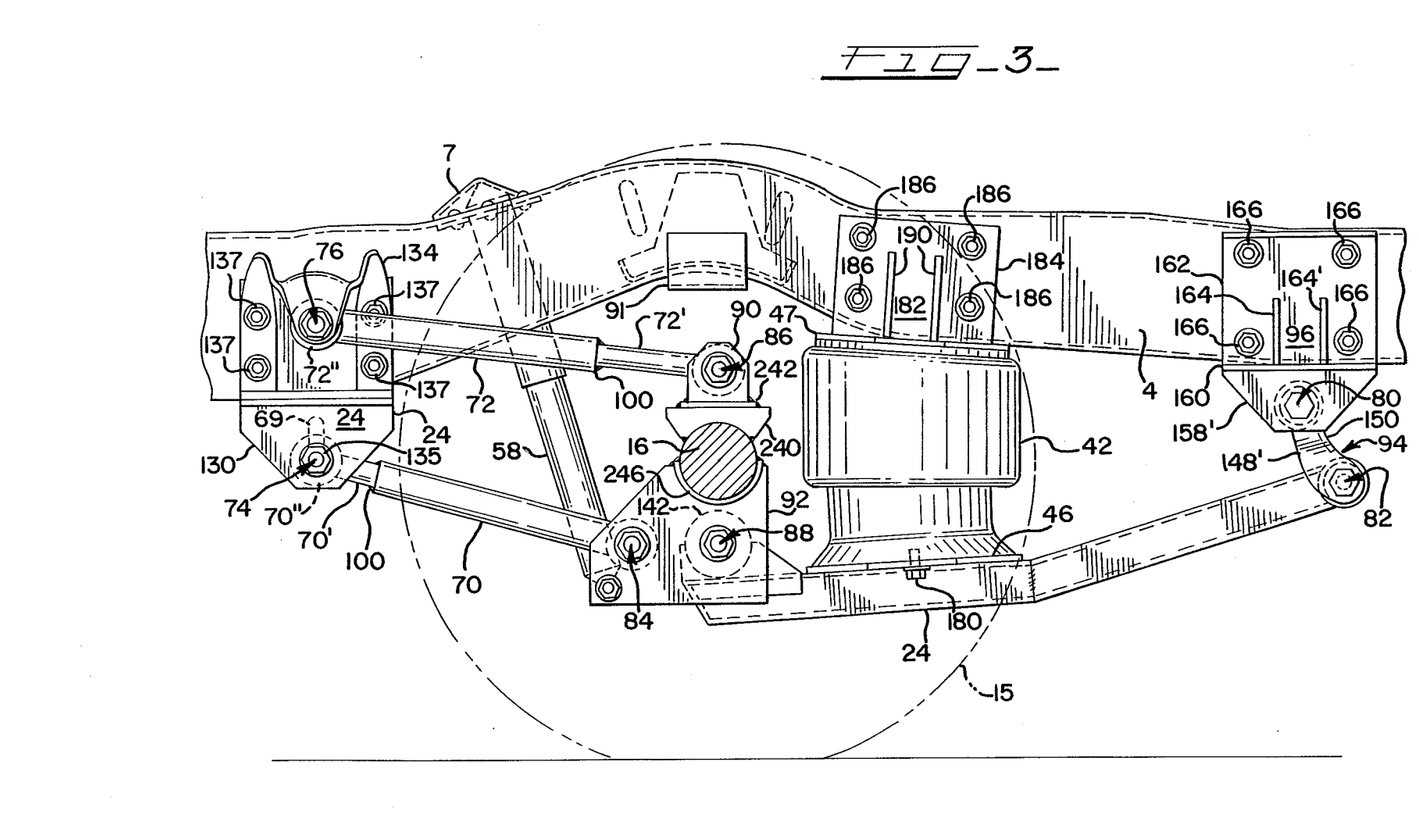
FIG. 3 is a partially sectioned side elevational view of the preferred embodiment of the present invention, having a seven-point suspension system and divergent torque arms.
Figures 4, 7:
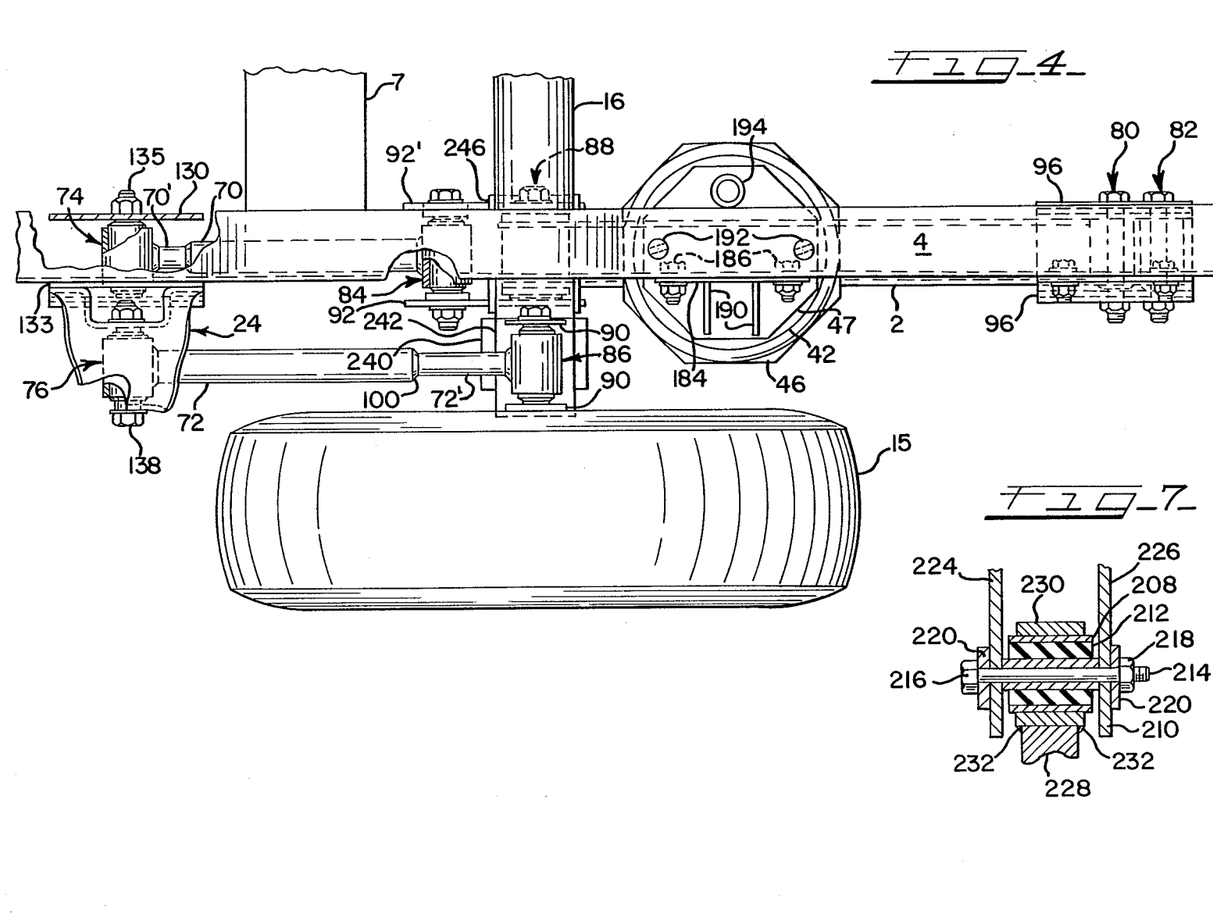
FIG. 4 is a partially sectioned plan view of the suspension shown in FIG. 3.
FIG. 7 is a representative cutaway view of a resilient bushing installed in a pivot assembly employed in the invention.
Figure 5:
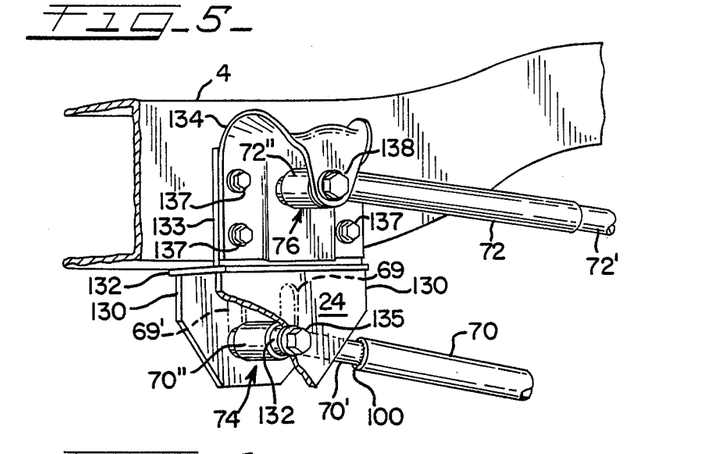
FIG. 5 is a partially sectioned perspective view of the forward attachment region of the suspension of FIGS. 3 and 4, showing the mounting scheme for the torque rods.

The pin connections (pivot point assemblies) 74 and 76 shown in use in FIGS. 3–5 are similar to bushed pin connections which are common in the art, and are in general used, as shown in FIG. 7. They include an outer and an inner cylindrical sleeve 208 and 210 with an elastomeric means 212 bonded between them. An arm member 228, having a transverse sleeve 230 attached thereto, as by welding fillets 232, is fitted with such a bushing by press-fitting of the outer sleeve 208 thereinto. A steel pin 214 threaded at its opposite ends, or having a hexagonal head 216 at one end and a threaded portion at the other is inserted through two mounting plates 224 and 226 and tightly secured therebetween by a nut 218 to provide a compliant pivot. Washers 220—220 under the head 216, and nut 218 secure the assembly between two outer parallel plates 224 and 226. The remaining pin connections 80, 82, 84, 86 (third pivoting means), and 88 of FIGS. 3–6 are similarly configured.

With particular reference to FIG. 5, and also to FIGS. 3 and 4, the forward torque arm hanger assembly 24 consists of a lower portion comprising a plate 12 disposed to lie flat against the lower surface of the frame 4, two generally parallel spaced-apart depending plates 130 and 131 forming the supports for the lower torque arm 70. As can be seen, the lower torque arm 70 has an enlarged sleeve 70" affixed to the end thereof, as by welding, an elastomeric bushing 132 being inserted to pass through the sleeve. The bushing in turn is secured by a through-bolt 135 captively secured at the rear by a nut (not shown) to complete the lower torque arm pivot assembly 74. A vertical support plate 133 is affixed to the outer edge of the horizontal plate 132 and lies flat against the outer surface of the frame 4. An upper torque arm mounting plate 134 is captively secured to the vertical plate 133 by four through-bolts 137 passing through the vertical outer surface of the frame 4. The upper mounting plate is configured at the top thereof to fold outward and downward as shown. The upper torque arm 72 similarly has a sleeve 72″ welded transversely to the end thereof, this sleeve having a similar elastomeric bushing (not shown) inserted therein, the pivoting assembly 76 being completed by a pivot bolt 138 passing through the downward by extending portion of the upper torque arm hanger plate 132 and through the elastomeric bushing, to complete the upper torque arm pivot assembly 76. The location of the lower pivot point may optionally be made adjustable by providing generally vertically-running slots 69—69 to accept the through-bolt 135.

Referring now particularly to FIGS. 3 and 4, an axle hanger having upper and lower portions is rigidly affixed to the axle 16. In consonance with the concepts of the previous Hedenberg patent, showing an air spring suspension which can be retrofitted to standard leaf-spring suspension type vehicles, the present axle hanger system involves retention of a customary spring seat 240 rigidly attached to the axle, typically by welding. This seat 240 normally has a generally horizontally disposed upper surface lying parallel to the axis of the axle 16. To this is welded a base plate 242 lying parallel to and supported by the upper surface of the spring seat 240, most preferably by welding, and welded to this base plate are two parallel plates 90—90 configured in parallel arrangement generally aligned from front-to-rear of the vehicle. To the lower portion of the axle 16 is attached a semi-circular sleeve, the sleeve in turn having attached thereto two parallel downwardly depending plates 92—92, these lower plates again also being aligned parallel and in a front to rear direction. The two upper plates 90 and the two lower plates 92 serve as attachment points for the two torque arms (torque rods) 70 and 72, as well as for a pivot assembly 88 connected to the forward end of the carrier arm 2. Alternatively, both attachment systems may be secured to the axle 16 by U-bolt systems of the type shown in FIG. 1.

The rear second end of the upper torque arm 72 is pivotally attached by pin connection 86 (third pivoting means) to the upper axle mounting means or hanger consisting of plates 90—90. Similarly, the rear (second) end of the lower torque arm 70 is connected to a forward portion of the axle hanger lower mounting plates 92 at a pivot point generally forward of the axle 16 by means of a pivoting assembly 84 (fourth pivoting means). A shock absorber 58 is similarly pivotally connected at one end to this region of the lower hanger plates 92, the other end of the shock absorber being captively restrained in a transverse channel 7 of the frame 4 by securing means (not shown). It will be noted that this configuration of pivotable torque areas provides a modified "parallelogram" suspension. A conventional elastomeric buffer 91 secured to a lower face of the frame 4 above axle 16 serves to restrain the vertical motion of the axle under severe shock.

The carrier arm 2 trailing arm is fashioned as a generally long box like structure, the forward end of the carrier arm being pivotally attached to the lower axle hanger plates 92—92′ by means of a pivot assembly 88 (fifth pivoting means) containing an elastomeric bushing assembly (not shown) passing through a sleeve 142 rigidly attached to the forward end of the carrier arm 2.

The rear end of the carrier arm 2 is connected by a pivot point assembly 82 (sixth pivoting means) to a rear link assembly or shackle assembly 94 at a first end thereof, the other end of the link being connected to a rear frame hanger 96 at a pivot point assembly 80 (seventh pivoting means).

FIG. 6 shows a cutaway view of this assembly in more detail. The rear link assembly 94 is fashioned from a central strap 150 configured with a cylindrical sleeve-forming wrap at the upper end thereof to accept an inserted elastomeric bushing 168, the lower generally planar remainder of the strap being welded at opposite edges thereof to a pair of parallel plates 148—148′. The rear end of the carrier arm 2 is provided with a transversely affixed bushing sleeve 156 carrying a bushing (not shown) therein, the bushing being held to the lower end of the shackle plates 148—148′ by means of a pivot bolt 152 passing through the structure to a nut 134 to complete the pivot assembly 82 as shown. The rear frame hanger assembly 96 includes a main plate 162 attached to the vertical outer surface of the frame 4 by means of four bolts 166, below which is attached a horizontal plate 160 to the lower edge of the plate 162 by welding, the plate 160 being configured at right angles so as to lie against the lower horizontal surface of the frame 4. Stiffener webs 164—164′ are welded between the vertical plate 162 and the horizontal plate 160 for rigidity. Attached to the lower surface of the horizontal plate 160 are two parallel downwardly depending plates 158—158′ oriented in a front-to-rear direction. The elastomeric bushing 168 is similarly engaged by a through-bolt assembly passing through the two plates 158—158′ to complete the rear link or shackle assembly.

The installation of the air spring 42 in the present embodiment is similar to that shown in the Hedenberg patent. A generally octagonal platform 46 is placed on the upper surface of the rectangular carrier arm 2 and attached thereto by welding. A base portion of the air spring 42 is attached to this support plate 46 by means of through-bolts 180 passing through the support plate 46 from below to engage threaded inserts (not shown) in the base of the air spring 42. An upper air spring attachment assembly 182 includes a vertical plate 184 affixed to the outer vertical surface of the frame 4 by means of through-bolts 186 passing through the frame 4. A horizontal platform 47 is attached to the base of the vertical plate 184 by welding, a pair of vertically disposed outwardly extending gussets 190—190 extending from the vertical plate 184 to the horizontal plate 188. The horizontal platform 47 is thus rigidly secured to the frame 4. The upper portion of the air spring 42 is rigidly secured to the support plate 47 by means of screws 192—192 passing through the support plate 188 from above. The air spring 42 is thus captively secured between the frame 4 and the carrier arm 2. As will be noted in FIG. 4, the air spring 42 has an airline fitting 194 for attachment to the system air supply.

The air spring 42 may be made of any suitable type of elastomeric material, such as rubber, and formed as a hollow bag which is inflatable and flexible. Such springs are commercially available. The type of spring used in the preferred embodiment is of the rolling sleeve-type, which is more flexible and is designed to give a better riding characteristic than the more rigid single lobe or double convolute air springs often used on truck trailers.

It will be noted that vehicle static support is entirely pneumatic, employing no auxiliary mechanical springs. The preferred embodiment shown in FIGS. 3-6 uses seven-point articulation with prescribed conical rates of the seven pivot point assemblies 74, 76, 80, 82, 84, 86 and 88 to provide lateral stiffness to suppress lateral axle displacement, while allowing substantially independent suspension of the two wheels.

The torque rods 70 and 72 are disposed to be rearwardly divergent about the center-line or axis of the axle 16 so as to provide, among other things, an anti-rise feature upon strong braking. Such an arrangement has been employed in racing automobiles in front and/or rear suspensions to prevent or suppress the tendency of the vehicle to nose down during braking, and to nose up during acceleration. Since the horsepower to weight ratio of vans and ambulances is much lower, acceleration rise of the front suspension and concomitant drop or squat of the rear suspension is of tolerable magnitude. Braking decelerations, however, are of substantially greater magnitude, and an anti-rise feature in an ambulance rear suspension is of substantial value in reducing vehicle pitching.

The anti-rise feature of such a suspension as shown in FIG. 3 is achieved by disposing the torque arms 70 and 72 in a diverging configuration as they extend to the rear from the torque rod hanger 24 to their respective rear pivot point assemblies 84 and 86 disposed generally above and below the axle 16. Upon braking, forces applied to the torque rod hanger 24 through the torque rods 70 and 72 both yield vertical components of opposing directions and in general differing magnitude. By proper positioning of the pivot assemblies 74, 76, 84, and 86 the net force of the torque rods 70 and 72 on the torque rod hanger 24 can be directed downwards to counteract substantially the rising tendency of the rear of the frame 4 on braking. Since the torque rod angles will vary with loading, the use of an air suspension system which can provide height restoration for varying loads allows these angles to be preserved at a chosen value. This aspect will be discussed in additional detail subsequently.

The remainder of the suspension is as described with reference to FIG. 1. For purposes of clarity, the arm adjustment features shown in the previous embodiment, have been omitted in the embodiment as shown in FIGS. 3-5, which show telescoping torque arm extensions 72' and 70' set to proper length, as for a given vehicle loading, and secured in position by welding fillets 100. Referring to FIG. 1, such features as an adjustable torque arm assembly 18 and vertical adjustment means for the forward end of the lower torque arm 70 may be provided, e.g. slot 69 as in FIGS. 3 and 5, to allow for optimum torque arm angle for a given vehicle for an anticipated worst-case height-weight distribution. Alternatively pivot assemblies 86 or 84 could be configured with similar positioning slots.

The principal elements of a conventional air supply system for the air suspension are shown schematically in FIG. 2. As previously stated, details of the system as applied to the preferred embodiment have been deleted for clarity in FIG. 3, in particular the height sensing value 58 adjustably linked to the axle carrier 92 however, the functioning of these elements in either FIGS. 1 or 3 may be taken to be identical. As is normal in such systems, a source of air, usually an air compressor 110, is available which supplies a large main reservoir 112. An air line 114 extends from the main reservoir 112 to a tee fitting 116 which divides the air supply between each wheel suspension system. The remaining elements of the system are symmetrically disposed and of identical function on both sides; hence, only one side of the air supply system has been drawn,. From the tee 116 air is suppled via line 118 to the three-way height adjusting valve 54 (FIG. 1) operable to three positions in response to actuation by a height sensing means 119 which actuates valve to inflate or deflate the air spring 42 via lines 120 or 122 respectively so as to maintain a chosen predetermined average spring extension.

An optional ballast volume 124 and metering valve 126 may be inserted in line 120 to change the effective volume of the air spring, and hence its compliance. The valve 126 may be of the manually adjustable variable impedance type. In its simplest version it is operable to either a fully open state in which the ballast reservoir 124 fully communicates with the air spring 42 to add to its volume and increase its differential compliance, or alternatively to a nearly closed state wherein pressure surges arising from sudden air spring compression are not effectively communicated to the reservoir.

When the frame 4 (FIGS. 1 and 3) is too low the valve 54 is actuated to supply air to line 120 to further inflate the air spring 44. When the spring extension is at a chosen desirable value the valve 54 is in a blocking condition, effectively sealing lines 118 and 120. If the spring 42 is overextended, the height sensing means 119 actuates the valve 54 to connect line 120 to the atmosphere via a stub line 122, thereby bleeding the air spring down to proper extension, whereupon the valve 54 is again actuated to a sealing condition.

To prevent continuous cycling of the valve 54 as a result of rapid vibrational impulses during road travel, an internal element (not shown) in the valve serves to damp the response rate so that a spring extension beyond the established normal value must last several seconds before the valve acts to increase or bleed off spring pressure.

The cooperation between the height adjusting means of FIG. 1 as applied to the suspension of FIGS. 3-6 in particular, its implementation in the form of valve arm 56, valve 54, and turnbuckle 58, as well as torque arms of adjustable length 18 (18 and adjustable pivot positioning means i.e. slot 66 in FIG. 1, are all to be construed as representative and not necessarily limiting means whereby the torque rods 70 and 72 of FIG. 3 may be disposed at a chosen antirise orientation for a given vehicle loading configuration, i.e the vehicle mass and height thereof. This latter consideration can be of considerable importance in military ambulances, wherein casualty stretchers are frequently loaded high in the vehicle. Although simple screw-type adjustments are shown as adjustment means for these elements, it will be evident to those knowledgeable in the art that pneumatic means, servomechanism means or other systems may equally well be used to position these elements at will, in particular so as to optimize vehicle riding characteristics for varying heights of the center of gravity.

In this respect, the ballasting valve 126 may be varied to cooperate with such torque arm adjustment. Thus, a change in the setting of the height setting valve 54 causing the spring 42 to extend under increased air pressure, thereby raising the forward ends of the torque arms 70 and 72, will in general increase the stiffness of the spring. If desired, this stiffness may be optionally reduced by opening the ballasting valve 126 to a wider-open position.

The preferred embodiment of FIGS. 3-6 has been subjected to extensive testing at the Bendix Proving Facility at South Bend, Ind. A representative vehicle, a Ford truck Model E350RV with cutaway chassis was chosen for testing, since this vehicle frame and suspension is adopted and marketed by various custom suppliers as an ambulance. The test vehicle had an empty weight of 6000 pounds, and a maximum loaded weight of 10,250 pounds. Testing of ride and handling were carried out under varying load conditions, using the production (factory) rear suspension, and then using a replacement air suspension of the type described herein.

In the air suspension system tested on the vehicle two Firestone S5 air springs were employed, one on each wheel. Each ballasting reservoir 124 (FIG. 2) had a volume of 555 cubic inches, and was fully ported to its associated air spring 42, i.e. valve 126 was held fully open. The shock absorbers 56 were characterized by 180 lb. compression rate and 440 lb. rebound rate for a three-inch stroke at 85 cycles/minute.

The six pivot assemblies 74, 76, 80, 82, 84 and 86 were characterized by identical elastic rates, whereas the bushing in the main load bearing pivot assembly 88 on the forward end of the trailing arm 2 was substantially less compliant.

In particular, because of the substantially reduced conical rate of the pivot assembly 80 bushing, and insofar as lateral movement of the axle 16 is concerned, the trailing arm 2 extends substantially rigidly to the rear therefrom, with the axial and conical rates of the remaining pivot points serving to assist in restraining this movement.

As previously stated the test vehicle was initially tested as orignially manufactured, i.e. with a production leaf spring rear suspension. The rear suspension was then replaced with the preferred seven-point suspension as previously described and with shock, spring, and reservoir data as given above, and the same tests were run again for comparison of the performance of the two systems. Two types of tests were conducted: one drawn to comfort of ride, the other to handling and braking properties. The torque arm pivot points 74 and 76 were empirically positioned by noting the tendency of the rear of the vehicle to rise on sudden braking of a fully load vehicle and varying the pivot point spacing until a zero-rise condition was noted. Under such conditions the arms 70 and 72 diverged approximately seven degrees. All tests were run at this setting.

The road comfort tests consisted of affixing recording accelerometers to the vehicle frame immediately above the rear axle, and recording the vertical acceleration as the vehicle was driven at varying speeds under different load conditions over three courses known as "chatter bumps," "impact bumps," and the "undulating road."

The chatter bumps are a series of sharply defined recesses in the road surface simulating large holes in paving. The impact bumps are the converse, i.e. a series of rectangular ridges rising from the road surface. The undulated road has a series of smooth peaks and valleys, and measures the tendency of the vehicle to "leap" at high speed.

The peak accelerometer readings recorded in all cases were taken as the measure of vibration transmission to the vehicle. The results of the comfort test are summarized in Tables I II, and III below, with accelerations normalized in terms of "g" units, i.e. 32 feet per second per second.

TABLE I

| UNLADEN | | | |
|---|---|---|---|
| | Standard Production Suspension | Air Suspension | Percent Reduction |
| Chatter Bumps | 2.35 | 2.35 | 0.0 |
| Impact Bumps | 2.00 | 0.95 | 52 |
| Undulated Road | 1.70 | 1.15 | 32 |

TABLE II

| 75% LOAD | | | |
|---|---|---|---|
| | Standard Production Suspension | Air Suspension | Percent Reduction |
| Chatter Bumps | 2.45 | 1.80 | 27 |
| Impact Bumps | 1.85 | 1.05 | 43 |
| Undulated Road | 1.40 | 0.85 | 39 |

TABLE III

| 100% LOAD | | | |
|---|---|---|---|
| | Standard Production Suspension | Air Suspension | Percent Reduction |
| Chatter Bumps | 1.60 | 1.15 | 28 |
| Impact Bumps | 0.90 | 0.57 | 36 |
| Undulated Road | 1.75 | 0.95 | 46 |

It is clear that a substantial reduction of all transmitted vibration was achieved except for the unladen vehicle traversing the chatter bumps.

The braking test consisted of measuring the stopping distance of the vehicle at various initial speeds under varying loading conditions. The results are summarized in TABLE IV.

TABLE IV

| Braking Test | | | |
|---|---|---|---|
| | Speed (m/h) | Standard Production Suspension | Stopping Distances-feet Air Suspension |
| Unloaded: | 30 | 51 | 43 |
| | 60 | 185 | 172 |
| 75% load: | 30 | 52 | 48 |
| | 60 | 192 | 185 |
| 100% load: | 30 | 52 | 48 |
| | 60 | 192 | 183 |

A modest improvement in the braking properties will be noted. Although no measurements of rise of the rear suspension or braking were made, it was noted that the zero-rise condition appeared to be maintained irrespective of loading.

The handling tests consisted of constant radius turn tests, lane change tests, and acceleration stability tests. The constant radius turn tests consisted of driving the vehicle around a circular track at progressively increasing speeds. During this phase the steering angle, as derived from an electrical potentiometer affixed to and driven by the steering wheel, was recorded, from which a quantitative measure of understeer or oversteer was derived. Additionally, the roll angle of the vehicle was recorded. Lane change manuevers consisted of driving the vehicle along the track having pylon marks thereon to define severe lane change manuevers. Maximum roll, lateral acceleration, and yaw angle were recorded. Finally, acceleration tests were conducted to determine if oversteer or understeer was evident under wide-open throttle conditions. Each system was evaluated through a constant radius turn at speed increments of 5 mph from 10 to 30 mph. The air suspension system required less steering displacement to maintain the constant radius turn, and roll angle was approximately 50% less at 100% vehicle loading. This lesser roll angle can be attributed to the pressure equalization feature resulting from independent air supplies to the independent air springs. The air suspension also demonstrated less steering displacement and slightly reduced roll angle at zero and 75% loading.

Lane change tests were made by subjecting each system to the lane change manuevers at speed of 20 through 40 mph. Up to 75% vehicle loading the two systems were comparable, and differences between them were insignificant. At maximum load, however, the air suspension was characterized by approximately 33% more vehicle roll; however, handling through this maneuver presented no difficulties.

The acceleration tests indicated that only minor steering adjustments were required to maintain straight line direction for either system up to a maximum speed of 70 mph. With respect to the above mentioned vehicle roll during the lane changing tests, a subsequently installed anti-sway bar (not shown in the drawings) appeared to give marked reduction in this roll angle, without substantially effecting the remaining riding or handling characteristics of the vehicle when equipped with the air suspension as described herein.

Thus, the improved air suspension system of the invention provided substantially improved properties over a standard spring suspension, including riding properties and in particular provided a generally more stable system for use in vehicles such as ambulances, in which steadiness of ride can be a critical feature. The divergent torque arm suspension adjustably positionable to an optimum angle and held there at over a range of loadings provided somewhat improved braking while markedly suppressing rear-end rise of the vehicle suspension under such conditions. An adjustable feature for setting torque arm divergent angles allows the torque arms to be optimally positioned for anticipated worse-case loading conditions, e.g. a fully load military ambulance wherein the patients are loaded high in the vehicle, thereby substantially raising the center of mass and increasing the tendency of the vehicle to pitch on braking.

Although the invention has been described in some detail with reference to some preferred embodiments thereof, it will be understood that modifications other than those specifically desribed may be effected without departing from the scope and spirit of the invention. It is only limited as set forth in the attached claims.

I claim:

1. In a wheel supported vehicle having a frame, a generally non-rotatable rear axle means in the form of a dead axle or a housing for a live axle, and axle air suspension units, each said unit disposed to provide support for said vehicle from opposite ends of said axle means, the improvement wherein each said suspension unit comprises:
   axle carrier means fixedly attached to said axle means proximate to the outer end thereof;
   a torque arm hanger means attached to the frame of said vehicle generally ahead of said axle carrier means;
   an upper torque arm having a first end and a second end;
   a lower torque arm having a first end and a second end;
   first pivoting means for pivotally attaching said first end of said upper torque arm to said torque arm hanger means, said first pivoting means being rotatable about a first pivoting axis;
   second pivoting means for pivotally attaching a first end of said lower torque arm to said torque rod hanger means generally below said first end of said upper torque arm, said second pivoting means being rotatable about second pivoting axis, the pivoting axes of said first and second pivot means being disposed generally parallel to the axis of said axle means to as to allow the second or rear ends of said torque arms to move in generally parallel vertical directions;
   third pivoting means rotatable about a third pivoting axis for pivotally attaching said rear end of said upper torque arm to said axle carrier means at a point generally above said axle axis;
   fourth pivoting means rotatable about a fourth pivoting axis for attaching said second end of said lower torque arm to said axle carrier means at a point generally below said axle means axis, said third and fourth pivoting means having their pivoting axes generally parallel to said axle means axis, the locations of said first, second, third, and fourth pivoting means being chosen such that said torque arms are disposed rearwardly to diverge from one another to extend towards opposite sides of the axis of said axle means;
   trailing arm having a forward end and a rearward end;
   fifth pivoting means for pivotally attaching said forward end of said trailing arm to a point on said axle carrier means generally below said axle axis;
   a link member having a first end and a second end;
   sixth pivoting means for pivotally attaching said rearward end of said trailing arm to a first end of said link;
   seventh pivoting means for pivotally attaching the second end of said link to a portion of said frame located to the rear of said axle means; and
   air spring means including at least one air spring interposably mounted between said frame and said trailing arm in a region generally between said axle means and said sixth pivoting means so as to transmit substantially the entire load between said vehicle and said axle means, said air spring means including automatic air spring extension controlling means for maintaining said torque rods at a chosen disposition under varying vehicle loading conditions, said fifth, sixth, and seventh pivoting means having their pivoting axes generally parallel to said axle axis.

2. The air suspension unit of claim 1 wherein there is provided length adjusting means for adjusting the length of at least one of said upper and lower torque arms.

3. The air suspension unit of claim 1 further including means for adjustably changing said chosen disposition.

4. The air suspension unit of claim 3 wherein said means for changing said chosen disposition includes means for adjustably setting the relative location of at least one of said first, second, third, or fourth pivoting means so as to change the angle of divergence between said torque arms.

5. The air suspension unit of claim 1 wherein there is provided adjustable positioning means for adjustably varying the positioning of said first and second pivoting means with respect to each other.

6. The air suspension unit of claim 1 further including means for adjusting said air spring extension controlling means over a range of values to controllably vary said chosen disposition of said torque arms.

7. The suspension of claim 1 wherein at least some of said pivoting means include resilient support means for allowing resilient elastic deflection of their respective pivoting axes.

8. The air suspension unit of claim 7 wherein all of said pivoting means include said resilient support means, and said first, second, third, fourth, sixth and seventh pivoting means are characterized by conical elastic rates, substantially less than the conical elastic rate of said fifth pivoting means.

9. The suspension of claim 1 further including a shock absorber unit connected between said frame and said axle carrier means.

10. The air suspension unit of claim 1 wherein said first torque arm is generally disposed in a vertical plane perpendicular to the axis of said axle means, and said second torque arm is generally disposed in a vertical plane perpendicular to the axis of said axle means.

11. In a wheel supported vehicle having a frame, a generally non-rotatable rear axle means in the form of a dead axle or a housing for live axle, axle suspensiion units each disposed to provide support for said vehicle from opposite ends of said axle means, and air spring means associated with each of said suspension units for maintaining a constant distance between said frame and said axle means over a range of vehicle loading, the improvement wherein each said unit comprises:

axle carrier means attached proximate to the outer end of said axle means;
  a torque arm hanger means attached to the frame of said vehicle generally ahead of said axle carrier means;
  first and second torque arms;
  first and second pivoting means for attaching the forward ends of said first and second torque arms to said torque arm hanger means;
  third and fourth pivoting means for respectively attaching the rear ends of said first and second torque arms to said axle carrier means, all of said pivoting means having pivoting axes disposed generally parallel to the axis of said axle means, said pivoting means being located such that said torque arms are disposed rearwardly to diverge from one another to extend toward opposite sides of said axis of said axle means, said air spring means including automatic air spring length controlling means for maintaining said torque arms at a chosen disposition under varying vehicle loading conditions.

12. The air suspension unit of claim 11 wherein there is provided length adjusting means for adjusting the length of at least one of said upper and lower torque arms.

13. The air suspension unit of claim 11 further including means for adjustably changing said chosen disposition.

14. The air suspension unit of claim 13 wherein said means for changing said chosen disposition includes means for adjustably setting the relative location of at least one of said first, second, third, or fourth pivoting means so as to change the angle of divergence between said torque arms.

15. The air suspension unit of claim 14 wherein there is provided adjustable positioning means for adjustably varying the positioning of said first and second pivoting means with respect to each other.

16. The air suspension unit of claim 11 further including means for adjusting said air spring length controlling means over a range of values to controllably vary said chosen disposition of said torque arms.

17. The air suspension unit of claim 11 wherein said first torque arm is generally disposed in a vertical plane perpendicular to the axis of said axle means, and said second torque arm is generally disposed in a vertical plane perpendicular to the axis of said axle means.

18. The air suspension unit of claim 11 wherein a first line passing through the pivoting axes of said first and third pivoting means passes above said axle means axis, a second line passing through said second and fourth pivoting means passes below said axle means axis, and said first and second lines diverge away from each other in a rearward direction.

19. The air suspension unit of claim 18 wherein the pivoting axis of said first-pivoting means lies generally above the pivoting axis of said second pivoting means.

20. The air suspension unit of claim 18 wherein the pivoting axis of said third pivoting means lies generally above the pivoting axis of said fourth pivoting means.

* * * * *